United States Patent
Kleva et al.

[11] Patent Number: 5,845,631
[45] Date of Patent: Dec. 8, 1998

[54] HEAT EXCHANGER FOR CONVECTION BAKING OVENS

[75] Inventors: James A. Kleva, Lake Grove; Andrzej Sliwowski, Lindenhurst, both of N.Y.

[73] Assignee: Kerry Ingredients, Inc., Beloit, Wis.

[21] Appl. No.: 915,916

[22] Filed: Aug. 21, 1997

[51] Int. Cl.⁶ .............. A47J 37/00; A21B 1/08; F24C 3/00; F24C 15/32
[52] U.S. Cl. .............. 126/21 A; 99/447; 99/470; 99/476; 126/21 R; 126/273 A; 219/400
[58] Field of Search .............. 99/330, 331, 447, 99/467–476; 126/20, 21 A, 21 R, 273 R, 273 A, 91 R, 91 A, 110 R, 246; 219/400; 312/236; 431/154, 353, 354, 347; 432/209

[56] References Cited

U.S. PATENT DOCUMENTS

| | | |
|---|---|---|
| 3,605,717 | 9/1971 | Sauer . |
| 3,710,775 | 1/1973 | Tamada et al. .............. 126/21 A |
| 3,719,180 | 3/1973 | Pere .............. 126/21 A |
| 3,831,579 | 8/1974 | Tamada et al. .............. 126/21 A |
| 3,991,737 | 11/1976 | Fabbro .............. 126/21 A |
| 4,471,750 | 9/1984 | Burtea .............. 99/476 |
| 4,484,561 | 11/1984 | Baggott et al. .............. 219/400 X |
| 4,515,143 | 5/1985 | Jabas . |
| 4,520,789 | 6/1985 | Rombouts . |
| 4,624,301 | 11/1986 | Baggott et al. .............. 99/470 X |
| 4,648,377 | 3/1987 | Van Camp .............. 126/91 A |
| 4,731,015 | 3/1988 | Johnson . |
| 4,813,398 | 3/1989 | Savage .............. 99/447 |
| 5,016,606 | 5/1991 | Himmel et al. .............. 99/474 |
| 5,165,889 | 11/1992 | Baggott .............. 432/152 |
| 5,186,620 | 2/1993 | Hollingshead . |
| 5,361,749 | 11/1994 | Smith et al. .............. 126/21 A |
| 5,385,137 | 1/1995 | Christensen et al. .............. 99/476 X |
| 5,546,925 | 8/1996 | Knight et al. . |
| 5,617,639 | 4/1997 | Jennings et al. . |

*Primary Examiner*—Timothy F. Simone
*Attorney, Agent, or Firm*—Griffin, Butler, Whisenhunt & Szipl

[57] ABSTRACT

An oven (1) for baking foods having a baking cabinet (2), at least one door (3), a plurality of burners (4), a plurality of annular heat exchange tubes (6) for receiving in an annulus (7) at an intake end (8) combustion gases (5) from the burners (4), a flue (9) for conducting the combustion gases (5) out of the oven (1), and a blower device (11) for recirculating air from within the baking cabinet (2), over the heat exchange tubes (6) and back into the baking cabinet (2). In the improvement, a first bracket (20) is removably attached to the oven (1), a second bracket (21) is attached to the oven (1) and spaced a distance from the first bracket (20). A plurality of annular heat exchange tubes (6) are disposed between the brackets (20, 21) with the intake end (8) of each tube attached to the second bracket (21) and the discharge end (10) of each heat exchange tube (6) attached to the first bracket (20) so as to form a removable rack (25) of the heat exchange tubes (6). Each heat exchange tube forms a curved configuration such that the length of the curved configuration of each heat exchange tube is greater than a distance (X) between the brackets so that each heat exchange tube is independently free to expand and contract with heating and cooling of the heat exchange tubes without significant force being placed on the brackets.

20 Claims, 5 Drawing Sheets

HEAT EXCHANGER FOR CONVECTION BAKING OVENS

The present invention relates to an improved heat exchanger for commercial baking ovens, and more particularly to a heat exchanger which provides greater heat transfer efficiency, simpler manufacture and substantially improved maintenance and repair ability.

BACKGROUND OF THE INVENTION

Commercial convection ovens are well known in the art and are widely used for commercial baking and like cooking of foods. Such convection ovens take many forms, including the well known rack-type oven, but, basically, all of the commercial baking ovens have an enclosed baking cabinet for holding foods during cooking, at least one door for providing access to the baking cabinet and at least one burner exterior to the baking cabinet for combusting fuel to hot combustion gases. The hot combustion gases pass through at least one and more usually a plurality of annular heat exchange tubes exterior to the baking cabinet so that the hot combustion gases heat the heat exchange tubes as the hot combustion gases flow therethrough. A flue is in fluid communication with a discharge end of each heat exchange tube(s) for conducting the combustion gases out of the oven. A blower device recirculates air from within the baking cabinet over the heat exchange tube(s) and back into the baking cabinet for baking, or otherwise cooking, the food held in the baking cabinet.

The efficiency, ease of operation and repair of such ovens is largely dependent upon the burner/heat exchange tube assembly which provides heat to the recirculated air from the baking cabinet, and considerable efforts have been expended in the art to improve that combination. The present invention makes a further improvement in that combination.

The general arrangement of a conventional oven of the present nature is disclosed in U.S. Pat. No. 3,605,717. In this earlier patent, it is disclosed that the burner fires into the inlet end of a heat exchanger tube, and the hot combustion gases pass into and through the tube. That general arrangement has, thus, been used for quite some time in commercial baking ovens.

A more modern version of that arrangement is disclosed in U.S. Pat. No. 4,731,015. In this arrangement, again, the burner fires into an inlet end of a heat exchange tube, and the heat exchange tube is in something of a reversed S-shape with a powered exhaust device attached to the outlet end of the heat exchange tube. This provides higher efficiencies of the oven.

U.S. Pat. No. 5,617,839 follows the same general arrangement described above and is illustrative of a more recent approach to convection oven design. In this arrangement, a plurality of so-called "in-shot" burners are fired into a combustion chamber which feeds a series of parallel disposed heat exchange tubes, the exit ends of which empty into a gas collection duct. That gas collection duct then feeds the hot combustion gases into the inlet ends of other parallel disposed heat exchange tubes and through those heat exchange tubes to an opposite gas collection duct. This is repeated throughout a bank of heat exchange tubes so that the hot combustion gases follow something of a series of U-shaped patterns through the heat exchange tubes and the gas collection ducts until, ultimately, flowed into a powered exhaust outlet for the oven, somewhat in the manner of U.S. Pat. No. 4,731,015, described above.

A basic difficulty connected with all prior art convection ovens is that the heat exchange tubes, which are operated at temperatures near the upper limit of the materials of construction of those tubes, have a very finite life expectancy before burn through of the heat exchange tubes occurs. Once burn through occurs, hot combustion gases can pass from the heat exchange tubes into the air recirculated from the baking cabinet. This will, of course, cause the combustion gases, which include high levels of carbon dioxide and carbon monoxide, as well as nitrous oxides, to not only come in contact with the food being baked in the baking cabinet but in contact with human operators of the oven. Since this is a very dangerous situation, when burn through occurs, usually the oven must be taken out of service and repaired. U.S. Pat. No. 5,617,839, mentioned above, provides a special exhaust system to provide a negative pressure in the combustion chamber and heat transfer tubes to avoid leaking of combustion gases into the baking cabinet.

The repair of burned through tubes can be very time consuming and expensive. For example, the arrangement of the above-noted U.S. Pat. No. 5,617,839 has a combustion chamber in which a number of "in-shot" burners are disposed, and the heat exchanger, comprised of the heat exchange tubes, is in combination with the combustion chamber. In addition, the heat exchange tubes connect with the gas collection ducts, as noted above. The heat exchange tubes in that arrangement are straight tubes and are fixed to the oven frame which constitutes part of the gas collection ducts. Since the tubes are straight tubes, the ends of each tube must be ruggedly attached to the collection ducts in order to maintain a seal of combustion gases from the baking chamber. Such a seal must withstand expansion and contraction of the tubes during heating and cooling of the oven. Therefore, an expansion joint must be made between the ends of the tubes and the collection ducts, and U.S. Pat. No. 5,617,839 suggests a rolled expansion circumference of the tube mating with a rolled flange edge of the oven frame. Such arrangements make it extremely difficult to remove a burned through tube from the heat exchanger.

It would, therefore, be of substantial advantage to the art to provide an improved oven where the heat exchanger, comprising a number of heat exchange tubes, can be easily repaired and, at the same time, provide high efficiency of heat transfer in the manner of the usual modern convection oven for commercial baking.

SUMMARY OF THE INVENTION

The present invention is based on several primary and subsidiary discoveries. First of all, as a primary discovery, it was found that, in the usual convection oven for baking foods, a first bracket can be easily removably attached to the oven. A second bracket is attached to the oven and spaced a distance from the first bracket. A plurality of annular heat exchange tubes are disposed between the brackets forming a removable rack of the heat exchange tubes. Thus, if a heat exchange tube burns through, the brackets may be detached from the oven and the rack is then easily removed from the oven and replaced by a new rack of heat exchange tubes at the site of operation the oven. Because the two brackets with the heat exchange tubes therebetween form a removable rack of the heat exchange tubes, the entire assembly of the rack of heat exchange tubes is easily removed and replaced.

As a second primary discovery, it was found that, in order for such rack to be practical from a manufacturing, weight and cost point of view, the brackets must hold the ends of the heat exchange tube without the rugged connection of the prior art, as noted above. To avoid such rugged connection, the present rack of heat exchange tubes is configured such that each heat exchange tube forms a curved configuration between the brackets such that the length of each heat exchange tube is greater than the distance between the brackets. With that curved configuration, each heat exchange tube is independently free to expand and contract with heating and cooling of the heat exchange tubes during heating and cooling of the oven without significant force being placed on the brackets or the attachments of the tubes to the brackets. With this arrangement, the brackets may be made of light weight material, and no rugged connection of the ends of the tubes to the brackets is required.

As a subsidiary discovery, it was found that if the heat exchange tube is curved such that the length of the tube is at least about two times the distance between the brackets, then the heat exchange tubes can expand and contract through any temperature range normally expected with the oven, e.g. from room temperature to the highest burner settings, without placing any substantial strain on the brackets and the means of connecting the tubes to the brackets.

As a further subsidiary discovery, it was found that, with certain arrangements of tubes, the heat transfer efficiency across the heat exchange tubes could be considerably improved. In this arrangement, at least one tube has its discharge end in a position for first contacting the cooler air recirculating from the baking oven, since the discharge end of the tube will have a lower temperature and the recirculating air will have a lower temperature, thus giving a greater temperature differential between the two and improving efficiency.

As another subsidiary discovery, it was found that the burners can be spaced from the rack of heat exchange tubes such that the rack is removable without disturbing the burners, and this greatly simplifies removal of the rack of heat exchange tubes for repair purposes, as noted above.

Thus, broadly stated, the present invention is in an oven for baking foods. The oven, generally, comprises an enclosed baking cabinet for holding the foods, at least one door for providing access to the baking cabinet, a plurality of burners exterior to the baking cabinet for combusting fuel to hot combustion gases, and a plurality of annular heat exchange tubes exterior to the baking cabinet for receiving in the annulus of each tube at an intake end thereof the hot combustion gases from the burners, so as to heat the heat exchange tubes as the hot combustion gases flow therethrough. A flue is in fluid communication with a discharge end of each heat exchange tube for conducting the combustion gases out of the oven and a blower device is provided for recirculating air from within the baking cabinet over the heat exchange tubes and back into the baking cabinet.

The present invention is an improvement in that known oven which comprises a first bracket removably attached to the oven, a second bracket attached to the oven and spaced a distance from the first bracket. A plurality of annular heat exchange tubes are disposed between the brackets with the intake end of each tube attached to the second bracket and the discharge end of each tube attached to the first bracket so as to form a removable rack of the heat exchange tubes. Each heat exchange tube is in a curved configuration such that the length of each heat exchange tube in the curved configuration is greater than the distance between the brackets so that each heat exchange tube is independently free to expand and contract with heating and cooling of the heat exchange tubes without significant force being placed on the brackets. The tubes are curved such that the length of a curved configuration of each tube is less than the distance between the brackets.

DETAILED DESCRIPTION OF PREFERRED EMBODIMENTS

Figure 1:
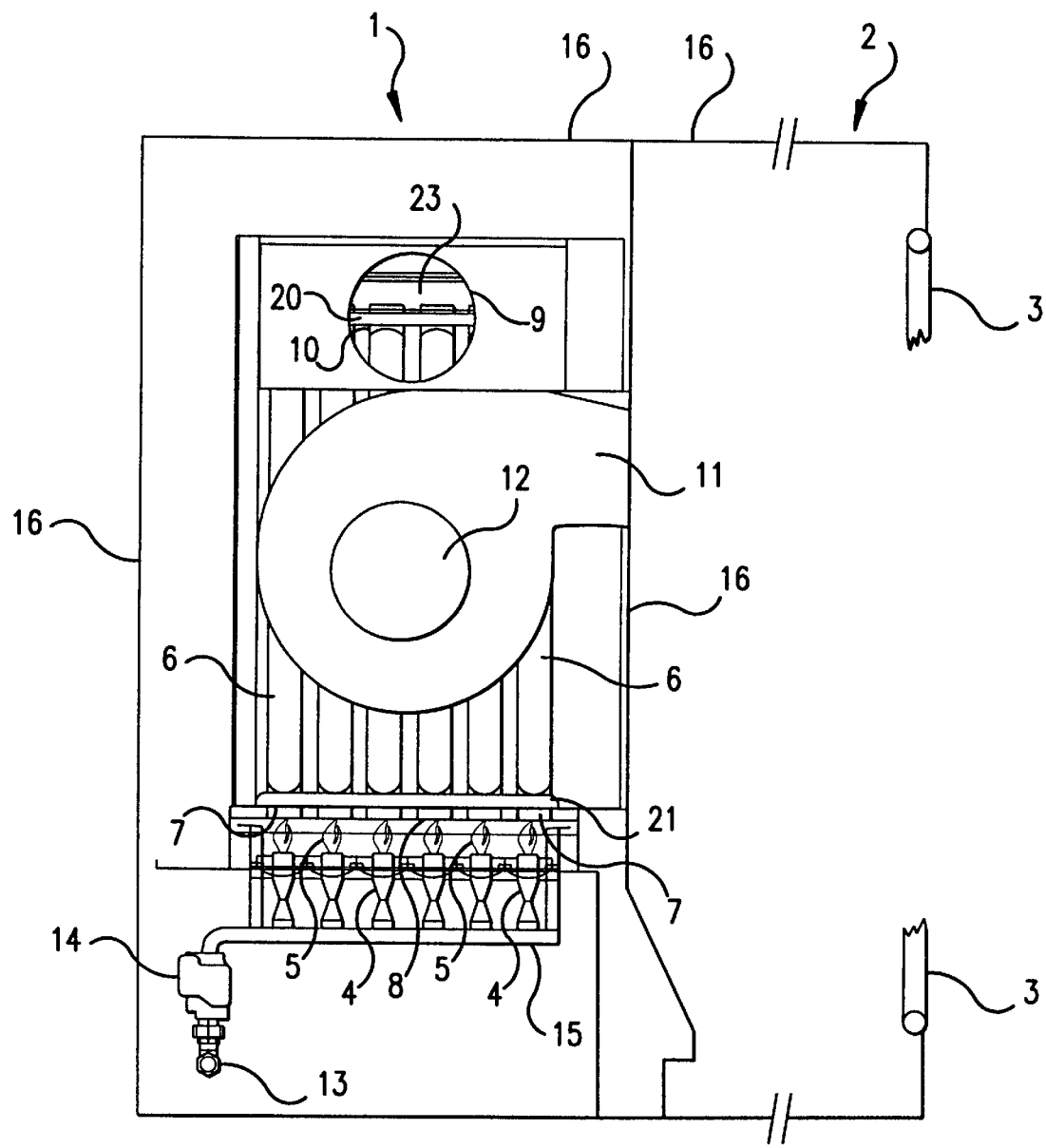
FIG. 1 is a top view, partially in schematic form, of the oven with a top cover removed for clarity purposes.

FIG. 1 shows a top view of the oven, generally 1, which is a commercial oven for baking foods on a large scale. The oven, generally 1, has an enclosed baking cabinet, generally 2, for holding and baking foods (not shown). At least one door 3 provides access to the baking cabinet 2. There are a plurality of burners 4 exterior of the baking cabinet 2 for combusting a fuel, e.g. natural gas, synthetic gas, oil, propane, etc., to hot combustion gases 5. A plurality of annular heat exchange tubes 6 exterior to the baking cabinet receive in an annulus 7 of each tube 6 at an intake end 8 the hot combustion gases 5 from burners 4 so as to heat the heat exchange tubes 6 as the hot combustion gases 5 flow therethrough.

A flue 9, of conventional design and arrangement, is in fluid communication with a discharge end 10 of each heat exchange tube 6 for conducting the combustion gases 5 out of the oven 1. A blower device 11, powered by an electrical motor 12, recirculates air from within the baking cabinet 2 over the heat exchange tubes 6 and back into the baking cabinet 2.

The burners 4 are fed with a fuel, as noted above, and generally this fuel is natural gas. In the embodiment shown herein, the natural gas is fed to the oven via a gas intake 13 through a conventional regulator 14 and a gas manifold 15 to supply burners 4, all in a conventional manner.

The oven 1 has structural walls 16, which are conventional in the art, to support the oven and the apparatus associated therewith.

All of the foregoing is the general conventional arrangement of such fuel-fired convection commercial baking ovens, which are well known to the art, and no further elaboration upon this general arrangement is necessary for sake of conciseness.

Figure 3:
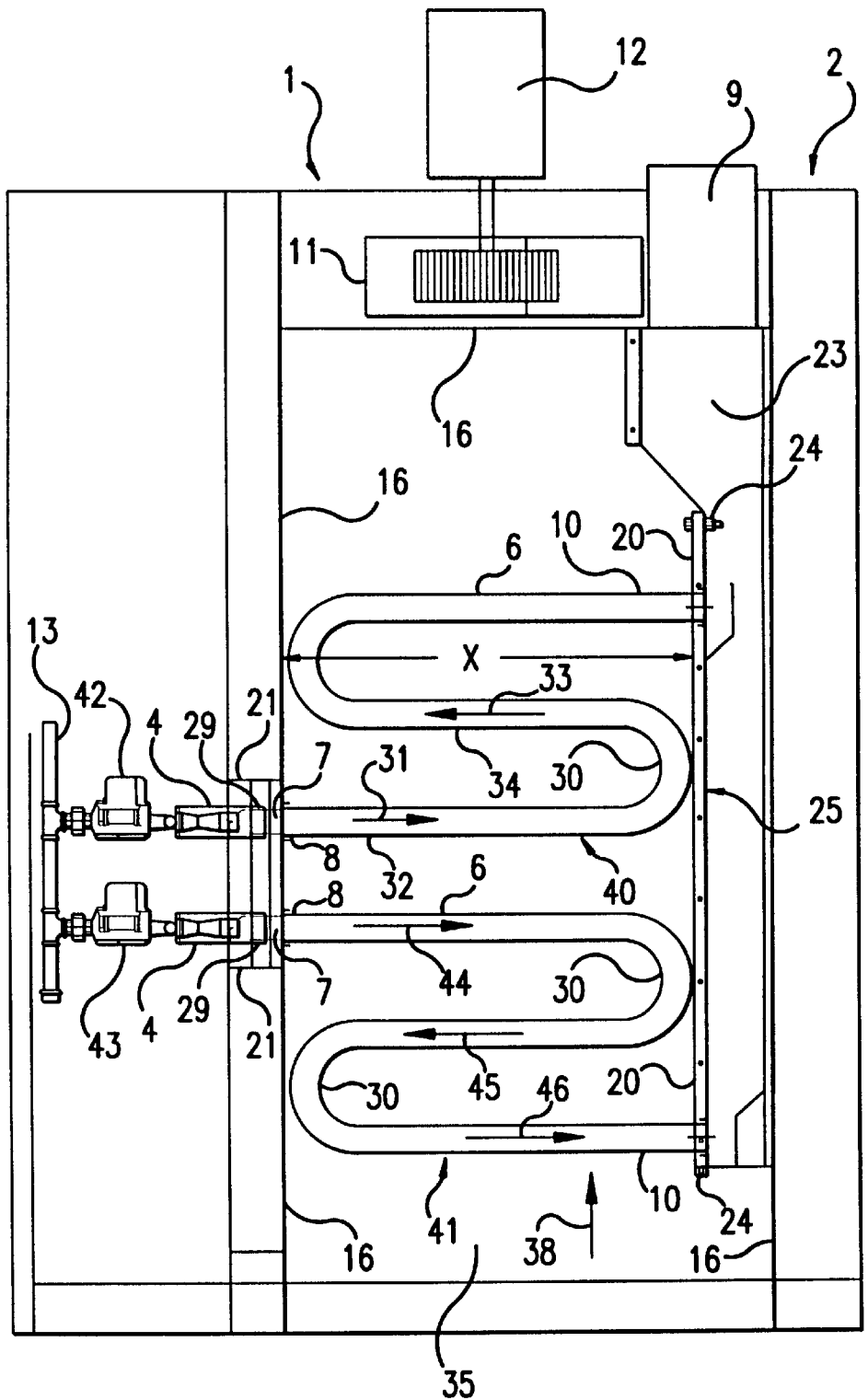
FIG. 3 is a detailed side view of burners and heat exchange tubes forming the removable rack.

The present invention involves an improvement in the burner and heat exchange tube arrangement, with the remainder of the oven being of conventional design. This novel burner and heat exchange tube arrangement is best seen in FIGS. 3 and 4.

Figure 4:
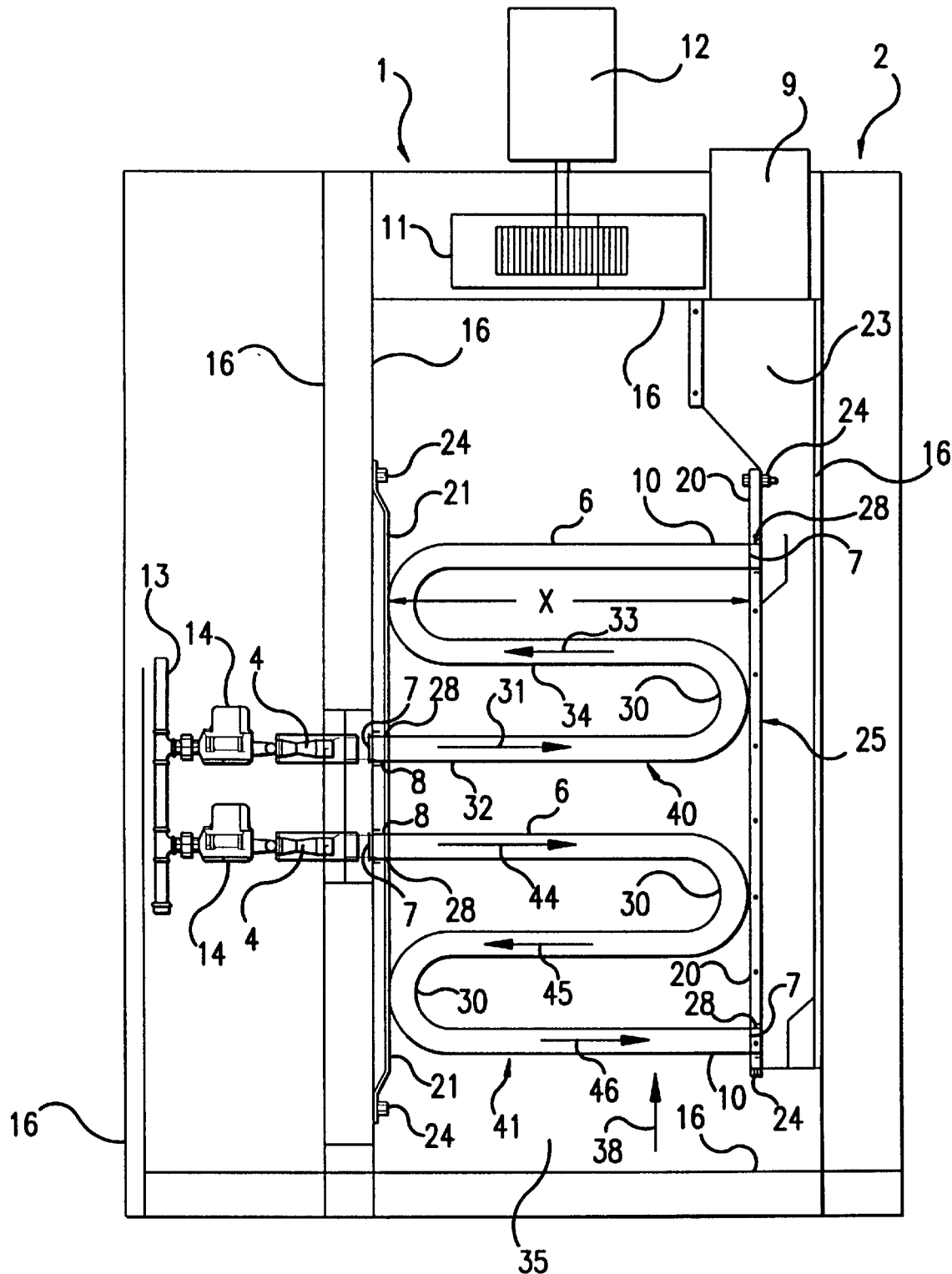
FIG. 4 is the same as FIG. 3, but showing another embodiment of that arrangement.

In the present arrangement shown in FIG. 4, a first bracket 20 is removably attached to the oven 1, for example, via attachment to a structural wall 16, and a second bracket 21 is attached to the oven and spaced a distance from the first bracket 20. As explained in more detail below, in the two embodiments shown in FIGS. 3 and 4, the embodiment of FIG. 3 is where the second bracket 21 is actually part of the structural wall 16 of the oven 1. In the second embodiment shown in FIG. 4, the second bracket 21 is separate from but attached to the structural wall 16 of the oven 1. The advantages and disadvantages of these two bracket systems will be explained below.

Again referring to FIG. 4, there are a plurality of annual heat exchange tubes 6 disposed between the brackets 20 and 21 with the intake ends 8 of each heat exchange tube 6 attached to the second bracket 21. It will be noted that the intake ends 8 of heat exchange tubes 6 protrude through second bracket 21 and face a burner 4, such that the combustion gases 5 (see FIG. 1) emanating from burners 4 fire directly into intake ends 8 of heat exchange tubes 6. It will be noted that there is no combustion chamber for the fuel fired from burners 4, as in prior art designs, and it will also be noted that the burners 4 are spaced from the intake ends 8 of heat exchange tubes 6 so that there is a space (clearance) therebetween. The burners 4, however, must be sufficiently close to intake ends 8 that the combustion gases from burners 4 fire directly into the annulus 7 at the intake ends 8 of tubes 6.

The discharge ends 10 of tubes 6 are attached to the first bracket 20, and the discharge ends 10 protrude through bracket 20 such that the annulus 7 is in fluid communication with a conventional passageway 23 that communicates with conventional flue 9 for removal of the combusted and cooled gases.

In the embodiment shown in FIG. 4, brackets 20 and 21 hold heat exchange tubes 6 in the oven 1 by simple fasteners 24, such as bolts, screws, sheet metal screws, etc. The combination of the brackets 20, 21 and the heat exchange tubes 6 form a removable rack, generally 25, of the heat exchange tubes 6. The rack 25 may be removed from the oven 1 simply by removing the fasteners 24, e.g. screws, nuts/bolts, etc., which will allow all of tubes 6 and both of brackets 20 and 21 to be easily and quickly removed from the oven 1 in the event that one of the tubes 6 burns through. Such easy removal is allowed because the intake ends 8 of tubes 6 are spaced from burners 4, and, hence, removal of the rack 25 from the oven 1 does not disturb the burners 4. This allow on site replacement of a rack 25 that has become defective, e.g. a burn through of one or more of the tubes 6, with a substitute rack 25 while the oven is on site and with very little down time of the oven.

Such easy removal and replacement are made possible by the configuration of the heat exchange tubes 6, since that arrangement does not require heavy and durable brackets 20 and 21 or rugged connections of the tubes thereto. In this regard, as shown especially in FIGS. 3 and 4, each heat exchange tube 6 forms a curved configuration and the length of each heat exchange tube is greater than the distance X between the brackets 20, 21. The curved configuration of each tube is less than the distance X, as shown in the drawings. With this arrangement, each heat exchange tube is independently free to expand and contract with heating and cooling of the heat exchange tubes without significant force being placed on the brackets 20, 21. With the avoidance of such force being placed on brackets 20, 21, the intake ends 8 and the discharge ends 10 need not be ruggedly attached to brackets 20, 21 and may be attached simply by a frictional fit in bores 28 of brackets 20, 21. This also means that brackets 20, 21 need not be ruggedly constructed, but may be made of very light weight and inexpensive materials, such as conventional steel plate or angle.

The embodiment of FIG. 3 differs from FIG. 4 in that the second bracket 21 is actually part of the structural wall 16. In this case, the bracket 21 likewise will have wall bores 29 from which the intake ends 8 of tubes 6 may be removed simply by sliding rack 25 to the right, as shown in FIG. 3, after removing fasteners 24. The curved configuration of tubes 6 also provides some bending for removal of intake ends 8 from wall bores 29. In this case, while this embodiment eliminates the second bracket and the cost thereof (an advantage), the removed rack will have only one bracket 20, and, as will be appreciated, with a single bracket 20, the rack combination of bracket 20 and tubes 6 will be less structurally stable for removal purposes and replacement purposes than the two racks as shown in FIG. 4. For this reason, even though two brackets are more expensive, the embodiment of FIG. 4 is the preferred embodiment, although the embodiment of FIG. 3 is quite acceptable.

It is, therefore, easily seen that the configuration of the heat exchange tubes 6 is important for allowing the construction of such a removable rack 25 of the heat exchange tubes 6, since it is that arrangement that allows simple attachments, as described above, of tubes 6 to brackets 20 and 21 at intake ends 8 and discharge ends 10. To ensure that there is enough flexibility in a heat exchange tube 6 so that expansion and contraction of tubes 6 during heating and cooling of the oven does not create a problem with the light weight brackets 20 and 21, e.g. bending of the brackets, etc., it is preferable that each heat exchange tube is curved such that the length of each tube in the curved configuration is about two times the distance X between the brackets and it is more preferable that each tube has a length at least about three times the distance X between the brackets. As can be seen, for example, in FIG. 4, a single heat exchange tube 6 has a total length, in the "S" curved configuration shown in that figure, of more than about three times the distance X.

By using such curved configuration, other advantages are also obtained. Thus, when the curved configuration of each tube has at least one bend 30, a first combustion gas flow direction 31 of a first portion 32 of at least some of the heat exchange tubes 6 is opposite to a second combustion gas flow direction 33 of a second portion 34 of at least some of the heat exchange tubes 6. This means that the air returned from the baking cabinet 2, at the bottom 35 of oven 1 will flow in an upwardly direction 38 and that cooler air returned from the baking cabinet will first contact the first portion 32, which is hotter by virtue of being next to burners 4, and the temperature difference ($\Delta T$) between that return air and the temperature of the tube 6 at first portion 32 will be greater for increased heat transfer. In addition, this type of flow is important in cooling the surface temperature of the heat exchange tubes nearest the burner to maintain safe temperatures. By flowing in this direction, the "hottest" section of tubes is cooled by the "coolest" recirculated air.

Figure 2:
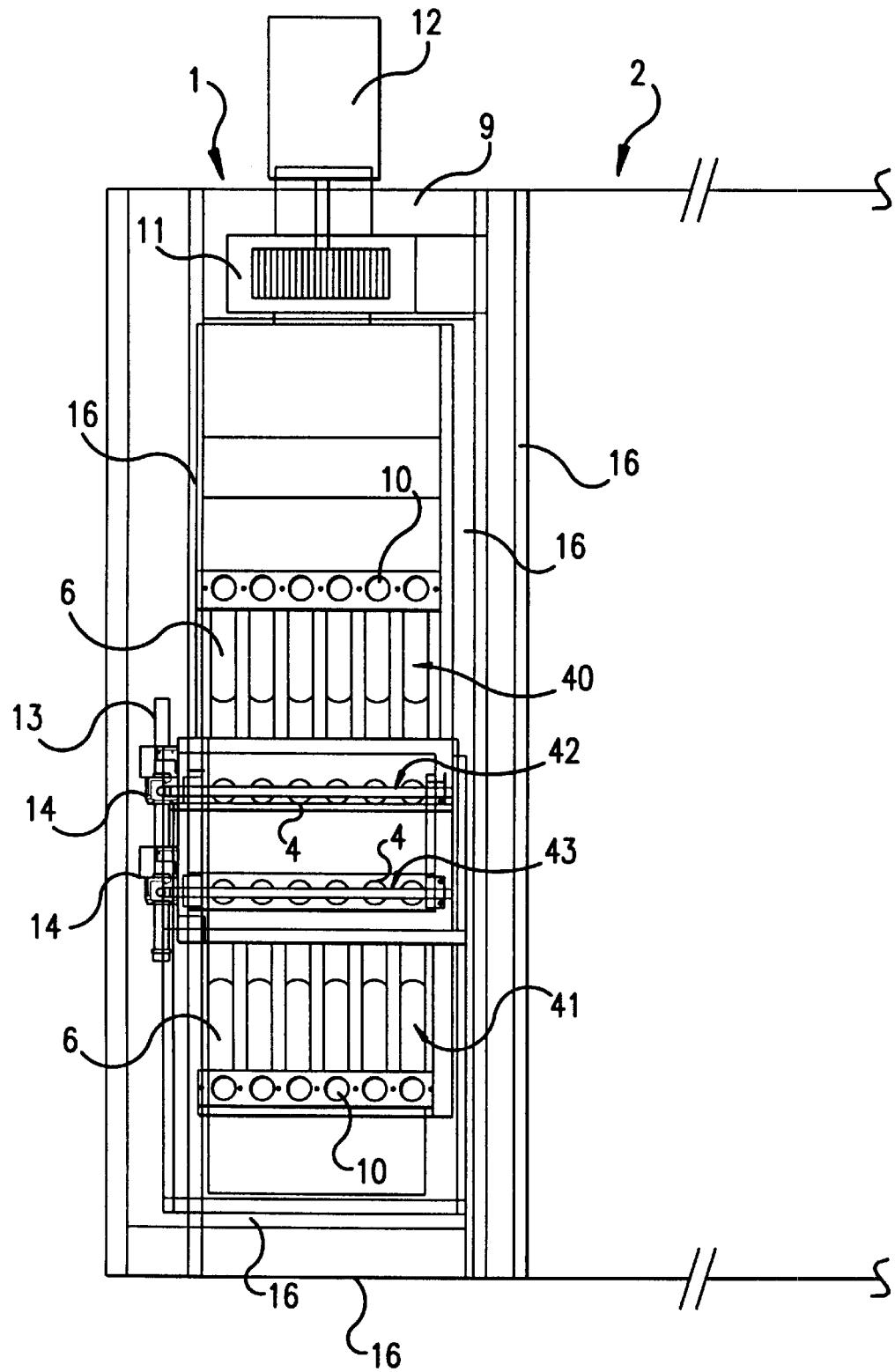
FIG. 2 is a side view of the oven with a side cover removed for clarity purposes.

In a most preferred embodiment of the invention, as shown in FIG. 2, there is an upper bank, generally 40, of heat exchange tubes and a lower bank, generally 41, of heat exchange tubes, with a corresponding upper burner rack, generally 42, and a corresponding lower burner rack, generally 43, respectively firing into the upper and lower banks 40, 41 of heat exchange tubes 6. Each bank of heat exchange tubes will have a plurality of heat exchange tubes therein, and that number may vary from only about two or three to as many as eight or ten, depending upon the diameter of the tubes, the heat capacity of the oven and the fuel input. Most typically, the heat exchange tubes will be about two inches in diameter and the tube material will be 439 stainless steel with about a 0.055 inch wall thickness. Tubes of this nature are commercially available and have been used, for example, as tubes in annealing furnaces (see U.S. Pat. No. 4,520,789) and in home heating furnaces (see U.S. Pat. No. 5,546,925). Burners for firing into these tubes are commercially available and are generally referred to as "in-shot" burners, and such burners are disclosed in U.S. Pat. No. 5,186,620, as well as the above noted U.S. Pat. No. 5,546,925.

It will be noted from FIG. 2 that the upper burner rack 42 fires into the bottom of the upper bank 40 of heat transfer tubes 6, and the lower burner rack 43 fires into the top of the lower bank 41 of heat transfer tubes 6. The purpose of the upper burner rack 42 firing into the bottom of the upper bank 40 of heat transfer tubes 6 is explained above, and the purpose of the lower burner rack 43 firing into the top of lower bank 41 of heat transfer tubes 6 can be best understood from FIG. 3. Thus, the hot combustion gases 5 from burners 4 of lower burner rack 43 fire into the intake ends 8 of the heat transfer tubes 6 of lower bank 41, and the hot combustion gases travel in a lateral direction 44, a reverse direction 45 and an exit direction 46. Since the air recirculated from baking cabinet 2 will be in the upwardly direction 38, the cooler air from that baking cabinet will first encounter the cooler temperatures of the hot combustion gases 5 in exit direction 46, and, thus, a greater ΔT will be experienced between the two temperatures. As the recirculated air from baking cabinet 2 is heated, it contacts the tubes with combustion gases flowing in the reverse direction 45, which is at a hotter temperature, and, therefore, the ΔT is essentially maintained. Likewise, recirculated air flowing from the portions of tubes 6 at the reverse direction 45 will contact the lateral direction 44 which will be at yet a hotter temperature, and, again, the increased ΔT will be maintained. This substantially increases the efficiency of the oven.

However, to make the combustion gas flows as smooth and as efficient as possible, the bends 30 in the heat transfer tubes 6 should preferably be a U-shaped bend, and each heat exchange tube 6 should have at least two such U-shaped bends, as shown in FIG. 3. Thus, with this arrangement, the rack 25 of heat exchange tubes 6 has at least one tube 6 with the discharge end 10 first contacting the recirculating air 38 from the baking cabinet 2 (the lower bank 41) and at least one heat transfer tube 6 where the intake end 8 of the tube first contacts the recirculating air from the baking cabinet 2 (upper bank 40). It will also be seen, especially from FIGS. 3 and 4, that the curved configuration of the heat transfer tubes is such that at least one tube extends vertically in the rack 25, and, preferably, all of the tubes extend vertically in rack 25. The tubes could extend laterally, i.e. opposite to that shown in FIGS. 3 and 4, but this would not provide the increased heat transfer, as described above.

In the event that a heat transfer tube burns through or otherwise fails during operation of the oven, as can be seen, for example, from FIG. 4, all that is necessary to remove rack 25 from the oven is that of removing fasteners 24 holding rack 25 to the oven and the rack may be removed directly without further disturbing of the components of the oven. In connection with the burners, this is true because the burners 4 are positioned such that the hot combustion gases 5 of each burner 4 are injected by that burner directly into the annulus 7 of a corresponding tube 6 at the intake end 8 thereof, and not into a combustion chamber as in the prior art. Further, the burners are spaced from the rack 25 of tubes 6 such that the rack is removable without disturbing the burners. With such an arrangement, if an oven must be taken out of operation because of burn through of a tube or the like, as soon as the oven cools down, the rack can be easily removed and replaced with a spare rack. This can be an on site repair, as opposed to the prior art, and one which can be carried out in a very short time. A rack with a burned out tube, for example, can then be returned to the manufacturer for refitting of the burned out tube in the rack and that rack can then be returned to the oven operator.

Also, as noted above, with the curved configuration of the heat exchange tubes and the length of each heat exchange tube in the curved configuration being greater than a distance X, each tube is independently free to expand and contract with heating and cooling of the heat exchange tube without significant force being placed on the brackets 20 and 21. Since no substantial force is placed on the brackets, the brackets can be made of a very light weight material, such as 16 gauge 430 stainless steel. This means that the weight of the entire rack 25 is quite low and can be easily handled for replacement of the rack. Of course, if desired, rack 25 could be separated into two racks, i.e. one rack being associated with upper bank 40 of the tubes 6 and one rack being associated with lower bank 41 of the tubes 6. This would cut the weight of each individual rack in half and make the handleability of each rack even more easy.

Figure 5:
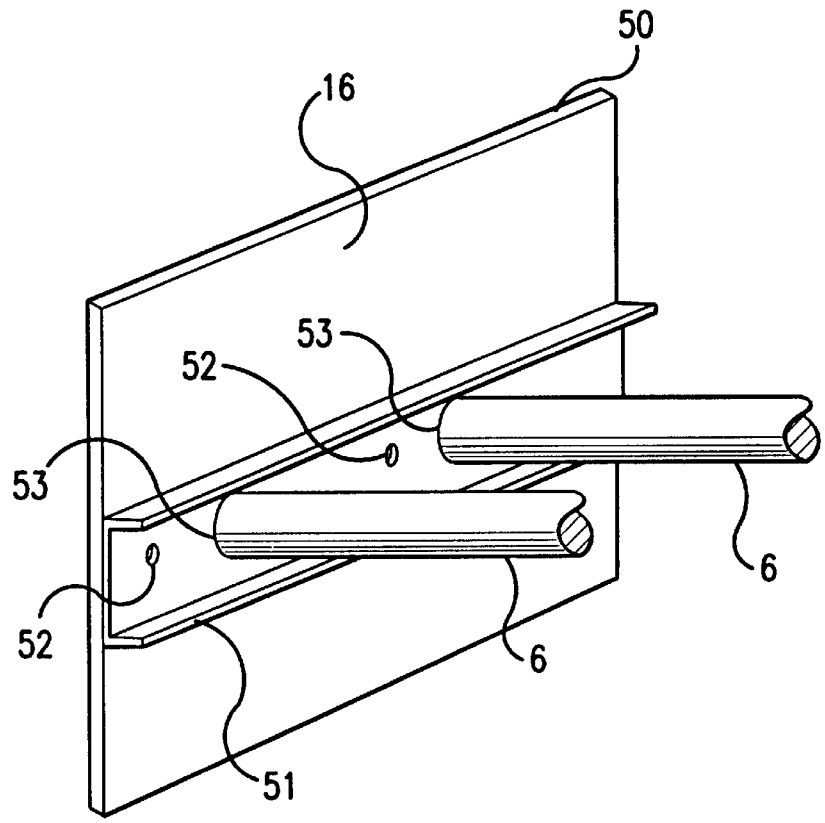
FIG. 5 shows a typical attachment of a bracket to an oven wall.
Figure 6:
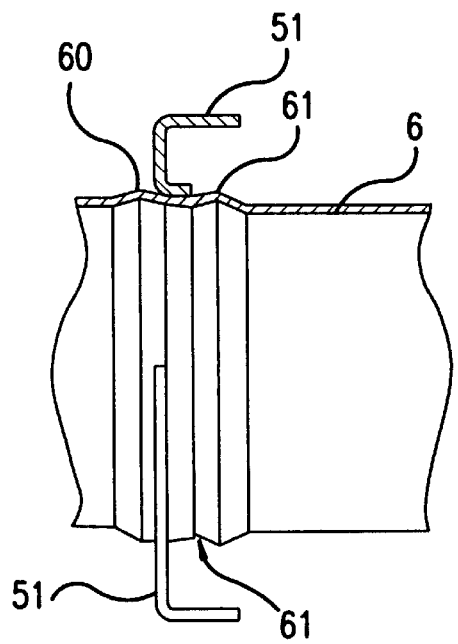
FIG. 6 shows a typical attachment of a tube to a bracket.

FIG. 5 shows a detail of an embodiment for attaching a bracket to an oven wall. In FIG. 5, a portion 50 of oven wall 16 has attached thereto a bracket 51 held to the oven wall 16 by screws 52 and tubes 6 pass through apertures 53 in bracket 51 and oven wall 16. Thus, by simply removing screws 52, the rack 25 (see FIG. 4) may easily be removed. The ends of tubes 6 can be secured to bracket 51 by a simple expanded joint, as shown in FIG. 6, where tube 6 is expanded at end portions 60, 61 to provide a positive seal between the tube and bracket. No rugged attachment of the tube to the bracket is required.

Thus, the present invention provides a very distinct advantage over prior art oven arrangements of this nature, and particularly solves a difficult maintenance problem existing in the prior art. Thus, the invention extends to the spirit and scope of the annexed claims.

What is claimed:

1. In an oven (1) for baking foods comprising an enclosed baking cabinet (2) for holding the foods, at least one door (3) for providing access to the baking cabinet, a plurality of burners (4) exterior to the baking cabinet (2) for combusting a fuel to hot combustion gases (5), a plurality of annular heat exchange tubes (6) exterior to the baking cabinet (2) for receiving in the annulus (7) of each tube (6) at an intake end (8) thereof the hot combustion gases (5) from the burners (4) so as to heat the heat exchange tubes (6) as the hot combustion gases (5) flow therethrough, a flue (9) in fluid communication with a discharge end (10) of each heat exchange tube (6) for conducting the combustion gases (5) out of the oven (1), and a blower device (11) for recirculating air from within the baking cabinet (2), over the heat exchange tubes (6) and back into the baking cabinet (2), the improvement comprising a first bracket (20) removably attached to the oven (1), a second bracket (21) attached to the oven (1) and spaced a distance from the first bracket (20), a plurality of annular heat exchange tubes (6) disposed between said brackets (20, 21) with the intake end (8) of each tube attached to the second bracket (21) and the discharge end (10) of each heat exchange tube (6) attached to the first bracket (20) so as to form a removable rack (25) of the heat exchange tubes (6), and each heat exchange tube forming a curved configuration such that the length of each heat exchange tube in the curved configuration is greater than a distance (X) between the brackets so that each heat exchange tube is independently free to expand and contract with heating and cooling of the heat exchange tubes without significant force being placed on the brackets and the tubes are curved such that the length of a curved configuration of each tube is less than the distance (X) between the brackets (20, 21).

2. The oven of claim 1, wherein at least one heat exchange tube is curved such that the length of the tube in the curved configuration is at least about two times the distance between the brackets.

3. The oven of claim 2, wherein the tube has a length at least about three times the distance between the brackets.

4. The oven of claim 1, wherein the curved configuration of each tube has at least one bend (30) therein such that a first gas flow direction (31) of a first portion (32) of the tube (6) is opposite to a second gas flow direction (33) of a second portion (34) of the tube (6).

5. The oven of claim 4, wherein at least one tube has a generally "U"-shaped bend.

6. The oven of claim 5, wherein the both brackets (20, 21) are removably attached to the oven.

7. The oven of claim 1, wherein the rack (25) of heat exchange tubes (6) has at least one tube with the discharge end (10) first contacting the air recirculated from the baking cabinet.

8. The oven of claim 7, wherein the curved configuration is such that said at least one tube extends vertically in said rack.

9. The oven of claim 1, wherein the burners (4) are positioned such that the hot combustion gas of one burner is injected by the one burner directly into the annulus (7) of one tube at the intake end (8) thereof.

10. The oven of claim 1, wherein the burners (4) are spaced from the rack (25) of tubes (6) such that the rack is removable without disturbing the burners.

11. The oven of claim 10, wherein the burners (4) fire directly into the annulus (7) of the intake end (8) of each tube (6).

12. The oven of claim 1, wherein both brackets (20, 21) are removably attached to the oven (1).

13. The oven of claim 1, wherein at least the first bracket (20) is attached to the oven by releasable fasteners.

14. The oven of claim 1, wherein significant force is not placed on the brackets (20, 21) during heating and cooling of the heat exchange tubes (6).

15. The oven of claim 1, wherein the heat exchange tubes (6) are attached to the brackets (20, 21) by a functional fit in bores (28, 29) of the brackets.

16. The oven of claim 1, wherein first bracket (20) is removably attached to the oven (1) and the second bracket (21) forms part of the oven structural wall (16).

17. The oven of claim 1, wherein the heat transfer tubes (6) are arranged in an upper bank (40) and a lower bank (41) with each bank having a plurality of heat exchange tubes (6) therein.

18. The oven of claim 17, wherein an upper burner rack (42) fires directly into upper bank (40) and a lower burner rack (43) fires directly into lower bank (41).

19. The oven of claim 18, wherein the upper burner racks (42) fires into the bottom of the upper bank (40) and the lower burner rack (43) fires into the top of the lower bank (41).

20. The oven of claim 19, wherein all of the heat transfer tubes (6) extend vertically in the rack (25).

* * * * *